United States Patent [19]
Martinez et al.

[11] Patent Number: 5,684,730
[45] Date of Patent: Nov. 4, 1997

[54] BOOTH MULTIPLIER FOR TRIGONOMETRIC FUNCTIONS

[75] Inventors: Georges Martinez, Caen; Nicolas Chauve, Fontaine les Dijon, both of France

[73] Assignee: U.S. Philips Corporation, New York, N.Y.

[21] Appl. No.: 572,249

[22] Filed: Dec. 13, 1995

[30] Foreign Application Priority Data

Dec. 21, 1994 [FR] France .................. 94 15410

[51] Int. Cl.⁶ .................. G06F 7/52; G06F 1/02
[52] U.S. Cl. .................. 364/757; 364/760; 364/721
[58] Field of Search .................. 364/718, 719, 364/720, 721, 723, 754, 757, 759, 760

[56] References Cited

U.S. PATENT DOCUMENTS

| | | | |
|---|---|---|---|
| 4,905,177 | 2/1990 | Weaver, Jr. et al. | 364/721 |
| 4,975,699 | 12/1990 | Frey | 364/721 X |
| 5,113,361 | 5/1992 | Damerow et al. | 364/721 |
| 5,276,633 | 1/1994 | Fox et al. | 364/721 |
| 5,493,581 | 2/1996 | Young et al. | 375/350 |

OTHER PUBLICATIONS

"Parallel Architecture Modified Booth Multiplier" by A.R. Cooper, Msc.,PhD., IEE Proceedings, vol. 135, Pt. G., No. 3, Jun. 1988, pp. 125–128.

*Primary Examiner*—Chuong D. Ngo
*Attorney, Agent, or Firm*—Michael E. Marion

[57] ABSTRACT

Circuit for multiplying data in accordance with a Booth algorithm, in which the coding of the control signals is adapted to the characteristics of symmetry of a trigonometric function. The values of the function which relate to a single quadrant are stored in a memory and a converter unit makes it possible to utilize the circuit whatever the quadrant. The values of the trigonometric function may be obtained through interpolation. Application to the calculations of Fourier transforms or DCT transforms.

20 Claims, 2 Drawing Sheets

BOOTH MULTIPLIER FOR TRIGONOMETRIC FUNCTIONS

FIELD OF THE INVENTION

The invention relates to a circuit for multiplying data by values of a trigonometric function of an input variable, which circuit comprises:
- first means for carrying out a multiplication by applying a Booth algorithm,
- second means for generating control signals applied to the first means, among which are sign control signals which are in conformity with the Booth algorithm,
- third means for producing the values of the trigonometric function.

The invention also relates to a digital processing system which utilizes such a circuit and, more particularly, a system for a calculation of Fourier transforms or other transforms. The invention likewise relates to a digital transmission system comprising a digital carrier recovery circuit.

BACKGROUND OF THE INVENTION

Circuits are currently used for calculating Fourier transforms when signals are processed digitally. A direct Fourier transform and a reciprocal Fourier transform relate for the former to a transformation of signals represented in the time domain into signals represented in the frequency domain and for the latter to a reciprocal transformation. These transformations, which perform complex exponential functions, imply the manipulation of trigonometric functions. This manipulation makes it necessary to carry out a considerable number of multiplications by sine/cosine functions.

It is thus desirable to utilize fast multiplication techniques to diminish the calculation time by coupling thereto, if possible, the use of reduced hardware to confine the cost of operation.

A known technique that satisfies these requirements is that of the Booth algorithm, which consists of dividing the bits of the operands of a multiplication into groups of 3 bits and generating a reduced number of control signals, for example, only three control signals per group of three bits:

ZERO: do nothing

SGN: sign control signal of the operation to be carried out

X2: determine whether the multiplicand is to be added once or twice to the partial sums products or subtracted therefrom (depending on SGN).

A multiplier which performs the Booth algorithm via these three control signals, realizes fast multiplications.

Nevertheless, techniques which make it possible to further improve this performance are still searched for.

The document entitled "Parallel architecture modified Booth multiplier" by A. R. Cooper, IEE Proceedings, Vol. 135, Pt. G., No. 3, June 1988, is known, which describes an improved Booth multiplier.

By regrouping the operations selected by the outputs of the Booth coders and by making them operate in parallel, it is possible to simplify the course of the operations realized in accordance with the Booth algorithm. Such a multiplier may be utilized in any calculation and does not take the particularity of the application into account, thus the data which are to be multiplied.

SUMMARY OF THE INVENTION

It is an object of the invention to further simplify the structure of a Booth multiplier by taking into account the specific character of the data notably when trigonometric data are used.

This object is achieved with a circuit for multiplying data by values of a trigonometric function of an input variable, as is described in the opening paragraph, in that the third means produce values of the trigonometric function in a limited field of the input variable, and in that the circuit comprises means for modifying the sign control signals in accordance with logic states of most significant bits of the input variable and converter means for converting the input variable to provide that the circuit works with any value of the input variable.

Thus, in an advantageous manner, by storing only the values for a limited field of the input variable (for example $-\pi/2 \leq \theta \leq 0$ for a function $\cos\theta$), the size of the memory is thus reduced considerably. Moreover, by causing the sign control signal to be modified in accordance with the means which conventionally generate the control signals, the command of the sign inversions, which is necessary for carrying out the multiplication even if the input value $\theta$ is not situated in the trigonometric quadrant that corresponds to the stored values, is made in a simple manner with little hardware. This particularly avoids having to add a multiply-by-1 multiplier to effect the changes of quadrants, which multiplier requires both calculation time and integrated-circuit space.

Preferably, the third means produce negative values expressed as a 2's complement. Thus, advantageously, for a given binary format (number of bits and binary weight distribution), it is possible to represent exactly the value $-1$, which would not be possible with the value $+1$, expressed as a 2's complement, without introducing a calculation inaccuracy of 1 least significant bit. This forms a considerable advantage in the case where multiplications are carried out with the described Booth algorithm.

According to a particular embodiment, the means which produce the values of the trigonometric function calculate these values by interpolating around a limited number of already stored function values. This also considerably reduces the size of the memory.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
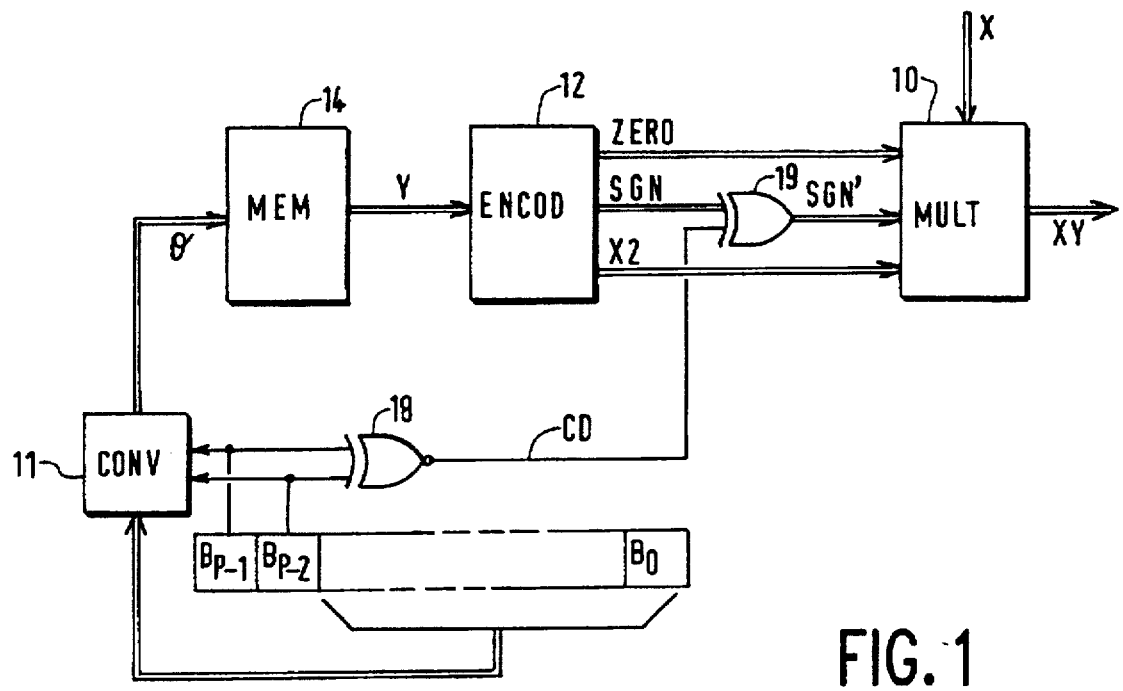
FIG. 1 shows a diagram of a multiplier circuit according to the invention.

FIG. 1 shows a multiplier circuit according to the invention comprising means 10 MULT for multiplying a multiplicand X by a multiplicator Y in accordance with the Booth algorithm, means 12 ENCOD for generating control signals in accordance with this Booth algorithm for allowing means 10 to operate, and means 14 MEM for applying the values of the multiplicator Y to the multiplier 10.

The Booth algorithm consists of adding a "0" at the least significant bit position, then regrouping the bits of the multiplicator expressed as a 2's complement, in groups of three consecutive bits which start with the added least significant bit, and deriving therefrom the operations to be carried out. Two consecutive groups overlap by one bit. The three bits of a group specify the type of operations to be carried out:

| Code | Operation |
|---|---|
| (001; 010) | add the multiplicand to the partial sum |
| (000; 111) | do nothing |
| (011) | add twice the multiplicand to the partial sum |
| (101, 110) | subtract the multiplicand from the partial sum |
| (100) | subtract twice the multiplicand from the partial sum. These five control signs may be brought back to only three control signals: |
| ZERO | do nothing |
| SGN | sign control signal of the operation to be carried out |
| X2 | determine whether the multiplicand is to be added/subtracted (depending on SGN) once or twice to/from the partial sum. |

Thus, there are as many times the three preceding control signals as there are triplets of bits in the multiplier Y. If the latter contains b bits, the number of triplets is equal to the nearest integer either to b/2 or b/2+1 depending on the parity of b.

The invention relates to modifications of the sign control signal SGN normally introduced by a Booth encoder (12).

The Booth multiplier receives the multiplicand X and various sets of the three preceding control signals. The multiplicator Y is coded by the coding means 12 ENCOD to produce the control signals sets ZERO, SGN and X2. According to the invention, the multiplicator Y represents values of a trigonometric function, for example, cos θ. It is obtained by addressing storage means 14, for example, a memory MEM, which have previously been loaded with values of the trigonometric function. The argument θ of the trigonometric function is applied to the input of the circuit according to a binary word $B_{p-1} \ldots B_0$. By utilizing the properties of symmetry of the function cos θ, it is possible to store in the memory 14 only the values cos θ that correspond to $\pi/2 \leq \theta \leq \pi$, that is to say, negative values of cos θ. The two most significant bits $B_{p-1}$ and $B_{p-2}$ make it possible to derive the values of cos θ for the other values of θ.

According to the invention, the sign control signal SGN of the Booth encoder is monitored. A gate 18 receives $B_{p-1}$ and $B_{p-2}$ and produces a signal CD. A family 19 of EXCLUSIVE-OR gates receives the signal CD and the signals SGN given by each Y-bit triplet. On the output, new sign signals SGN' are obtained which are used for selecting the type of operation to be carried out in the Booth multiplier 10. The binary word $B_{p-1} \ldots B_0$. is coded as a 2's complement. Each new sign control signal SGN' is then derived from the

TABLE 1

| $B_{p-1}$ | $B_{p-2}$ | CD | SGN | SGN' |
|---|---|---|---|---|
| 0 | 0 | 1 | 0 | 0 |
| 0 | 1 | 0 | 1 | 0 | 1 |
| 1 | 0 | 0 | 1 | 1 |
| 1 | 1 | 1 | 1 | 0 |

Preferably, memory 14 stores negative values of cos θ, thus with $\pi/2 < \theta < \pi$, or $\pi < \theta < 3\pi/2$.

If the value θ, which arrives on the input of the circuit, is not situated in the selected quadrant corresponding to the stored values in the memory, a converter unit 11 transforms the input value θ in dependence on the logic states of the most significant bits $B_{p-1}$, $B_{p-2}$. Depending on the contents of the memory 14 (sine or cosine), the conversion will consist of convening θ into π/2-θ and of changing, as required, the sign as a function of that particular quadrant.

Figure 2:
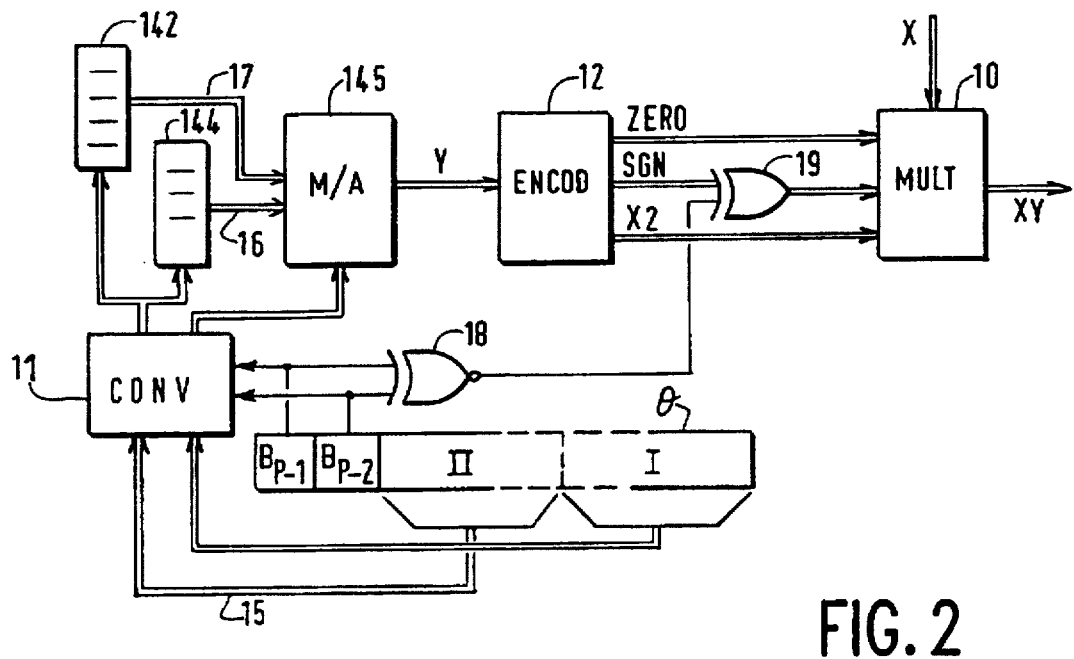
FIG. 2 shows a diagram of a multiplier circuit according to the invention which includes means for interpolating function values among values stored in a first memory bank.

To further reduce the hardware means, the means 14, which perform the trigonometric function, may operate via interpolation around a limited number of previously stored values of the trigonometric function (FIG. 2).

The binary word $B_{p-1} \ldots B_0$ is thus separated into three fields:
 a first field I formed by least significant bits of the binary word,
 a second field II formed by medium significant bits of the binary word,
 a third field III formed by the bits $B_{p-1} \ldots B_{p-2}$, which is used for monitoring the sign control signals as explained hereinbefore.

The first and second fields I and II are used for addressing (FIG. 2) a converter unit 11 CONV which transforms the input values θ into the value θ situated in the quadrant for which a limited number of values of the trigonometric function are previously stored in a first memory bank 142. The stored values may be corrected beforehand by specific correction factors which are intended to reduce errors caused by the interpolation method used.

The converter unit also addresses a second memory bank 144 in which previously interpolation coefficients are stored, calculated for the values of the trigonometric function which are stored in the first memory bank. The interpolation coefficients may be a true derived value or an approximate derived value formed, for example, by the mean slope of the segment joining two consecutive stored values of the function.

Thus, by addressing the two memory banks with the middle field II (with or without conversion, as the case may be) for example, one may read the value of the function cos θ (with corrections) and that of the interpolation coefficients for this value θ.

The field I of least significant bits is then used for calculating an interpolated quantity linked with the increment of field I.

Figure 3:
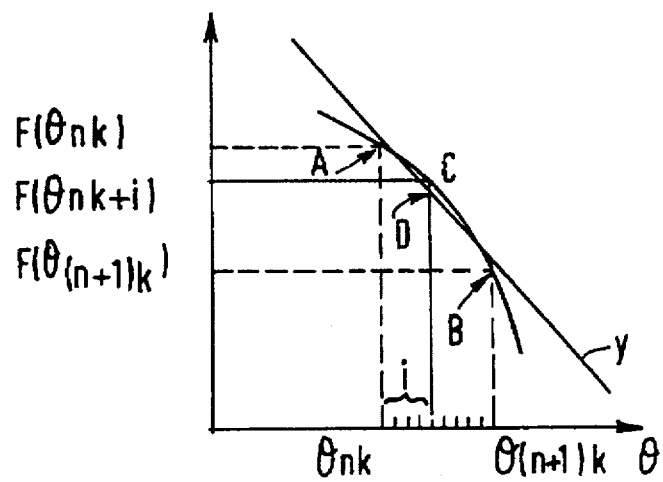
FIG. 3 shows a graph of an extended part of a function $F(\theta)=\cos(\theta)$.
Figure 4:
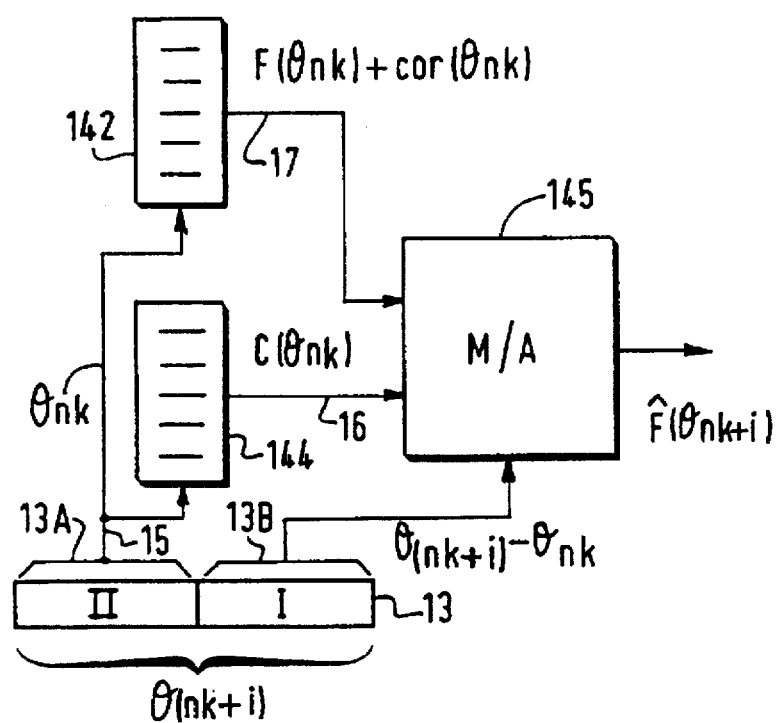
FIG. 4 shows a diagram of an interpolation circuit.

FIG. 3 represents a part of a function F(θ)=cos(θ) known by a limited number of values $F(\theta_{nk})$=cos($\theta_{nk}$) [point A], $F(\theta_{(n+1)k})$=cos($\theta_{(n+1)k}$) [point B], for values $\theta_{nk}$, $\theta_{(n+1)k}$ of the variable θ. In the graph n is the current index of the points A, B, ..., where $0 \leq n \leq (N/k)-1$, where k is an integer that determines the interpolation factor and where $\theta_n = 2\pi n/N$.

If a random value $\theta_{nk+i}$ of the variable is applied to the input of the circuit, the latter calculates via interpolation, an interpolated value near to the value $F(\theta_{nk+i})$ [point C]. In this form, the index i is a current index varying from 0 to k-1, so as to differentiate k intermediate values between $\theta_{nk}$ and $\theta_{(n+1)k}$.

For representing N values of the variable θ, $\log_2 N$ bits are necessary. A random value $\theta_{nk+i}$ of the variable is represented by a binary word for which the two most significant bits at the beginning are ignored and only the values belonging to a single quadrant are considered. The binary word 13 (FIG. 2) contains a first field 13A which contains most significant bits, and a second field 13B which contains least significant bits.

According to the invention, the interpolation is performed by using a number N/k of known values of the function. These N/k known values are preferably stored beforehand in a memory bank 142. The known values $F(\theta_{nk})$ are those corresponding to the log N/k most significant bits of the input variable.

For the N/k known values of the function (points A, B, etc.) according to the invention, there are also stored, preferably in storage means 144, N/k interpolation coefficients $C(\theta_{nk})$. These coefficients may be derivative values $F'(\theta_{nk})$ of the function $F(\theta_{nk})$. These derivative values may be mean derivative values calculated around each known point A, B, and so on. These interpolation coefficient values are preferably equal to the slope of the segments that connects two known consecutive points.

These interpolation coefficient values may also be formed by true derivative values calculated at the known points A, B, and so on.

To restrict inaccuracies, known function values which have previously been corrected by corrective terms are stored in the memory bank 142. The memory bank thus stores values $F(\theta_{nk})+\text{cor}(\theta_{nk})$. The term $\text{cor}(\theta_{nk})$ is calculated beforehand for each known point to minimize the mean square error between the interpolated values and the perfect trigonometric function.

When an input value $\theta_{nk+i}$ is applied to the input of the circuit, the field 13A of most significant bits addresses (connection 15) the memory bank 142 and the storage means 144:

the memory bank produces $F(\theta_{nk})+\text{cor}(\theta_{nk})$, constituting the approximate value of the interpolated value to be determined (connection 17), the storage means produce the interpolation coefficients $C'(\theta_{nk})$ (connection 16).

Let us consider the case where the function $F(\theta_{nk})$ is a cosine function and where the interpolation coefficient values are derived from the slope of a segment $y = a\,x + b$. This segment runs in the neighbourhood of the two known points A and B to indicate that correction coefficients occur in the calculation of the interpolated values.

An approximate value y of $\cos(\theta_{nk+i})$ [point D] is then such that:

$$y = \frac{\cos\theta_{nk+k} - \cos\theta_{nk}}{\theta_{(nk+k)} - \theta_{nk}} (\theta_{nk+i} - \theta_{nk}) + \cos\theta_{nk}$$

with $\theta_{nk+i} = \frac{2\pi}{N}(nk+i)$ $0 \leq i \leq k-1 \quad 0 \leq n \leq \frac{N}{k} - 1$ After known trigonometric transformations there is obtained:

$$Y = \left[ -2\sin\frac{(2n+1)k\pi}{N} \cdot \sin\frac{k\pi}{N} \right] \frac{i}{k} + \cos\frac{2\pi}{N} nk$$

To obtain an interpolated value $\hat{\cos}(\theta_{nk+i})$ which is nearer to the exact value $\cos(\theta_{nk+i})$, a correction term $\text{cor}(\theta_{nk})$ is introduced. This interpolated value is situated between the ordinates of the points D and C. Each correction term $\text{cor}(\theta_{nk})$ is determined by minimizing the sum $\Sigma(\hat{\cos}\theta_{nk+i} - \cos\theta_{nk+i})^2$ for $0 \leq i \leq k-1$.

The approximate value $\hat{\cos}(\theta_{nk+i})$ is then written as:

$$\hat{\cos}(\theta_{nk+i}) = \underbrace{\left\{ -\frac{2}{k}\sin\left(\frac{2n+1}{N} \cdot k\pi\right) \sin\left(\frac{k\pi}{N}\right) \right\}}_{F'} i +$$

-continued $$\cos\left(\frac{2\pi}{N} nk\right) + \text{cor}(\theta_{nk})$$

The circuit comprises calculation means 145, for example a multiplier/accumulator, which receives $C'(\theta_{nk})$, and the field 13B formed by least significant bits of the input value $\theta_{nk+i}$.

In a first step, the calculation means 145 calculate the partial result: $C'(\theta_{nk}) \cdot i$ and in a second step the calculation means add this partial result to the approximate value $F(\theta_{nk}) + \text{cor}(\theta_{nk})$ so that the interpolated value: $\hat{F}(\theta_{nk+i})$ is produced, leading to:

$$\hat{F}(\theta_{nk+i}) = [C'(\theta_{nk}) \cdot i] + F(\theta_{nk}) + \text{cor}(\theta_{nk})$$

Thus it is possible to reduce the size of the second memory by storing only a limited number of values having a reduced number of bits while a higher precision with respect to the results is obtained, which is particularly interesting in embodying integrated circuits.

In the case where they produce interpolated values, the third means comprise:

the first memory bank 142 for storing a limited number of negative values of the function which corresponds to the second bit field, at addresses coming from the second bit field, the second memory bank 144 for storing interpolation coefficients associated to the values stored in the first memory bank, at addresses coming from the second bit field, interpolation means for reading from the first memory bank an approximate value of the function by addressing the first memory bank by the second bit field of the input variable, for reading from the second memory bank the interpolation coefficient by addressing the second memory bank by the second bit field of the input variable, for calculating an interpolated quantity by multiplying the first bit field of the input variable by the addressed interpolation coefficient, while the interpolated quantity is summed with the approximate value to produce the interpolated value.

The circuit may be used in a digital data processing system to carry out calculations with respect to the Fourier transform, discrete cosine transforms or other transforms which utilize trigonometric functions.

The circuit can also be used in a digital transmission system in which the circuit according to the invention is used for forming a digital carrier recovery circuit. In that case the input variable is a phase error $\theta$, on the basis of which the circuit multiplies $\cos\theta$ values and $\sin\theta$ values by a multiplicand formed by a symbol that is to undergo a phase correction for a synchronization of the carrier recovery.

What is claimed is:

1. A circuit for multiplying data by values of a trigonometric function of an input variable, which circuit comprises:

first means for carrying out a multiplication by applying a Booth algorithm, second means for generating control signals applied to the first means, among which are sign control signals which are in conformity with the Booth algorithm, third means for producing the values of the trigonometric function, wherein the third means produce values of the trigonometric function in a limited field of the input variable, and in that the circuit comprises means for modifying the sign control signals in accordance with the input variable and converter means for converter the input variable to provide that the circuit works with any value of the input variable.

2. The circuit as claimed in claim 1, wherein the third means produce negative values of the trigonometric function.

3. The circuit as claimed in claim 2, wherein the sign control signals are inverted when the two most significant bits of the input variable are identical.

4. The circuit as claimed in claim 3, wherein the third means calculate the value of the trigonometric function via interpolation around a limited number of previously stored function values.

5. The circuit as claimed in claim 4, wherein the input variable is represented by a first least-significant bit field, by a second median-significant bit field and by a third most-significant bit field, and the third means comprise:

a first memory bank for storing a limited number of negative values of the function which corresponds to the second bit field, at addresses coming from the second bit field, a second memory bank for storing interpolation coefficients associated to the values stored in the first memory bank, at addresses coming from the second bit field, and interpolation means for reading from the first memory bank an approximate value of the function by addressing the first memory bank by the second bit field of the input variable, for reading from the second memory bank the interpolation coefficient by addressing the second memory bank by the second bit field of the input variable, for calculating an interpolated value by multiplying the first bit field of the input variable by the addressed interpolation coefficient, while the interpolated value is summed with the approximate value to produce the interpolated value.

6. The circuit of claim 1, wherein the means for modifying the signal control signals uses the logic states of the most significant bits of the input variable.

7. The circuit as claimed in claim 1, wherein the sign control signals are inverted when the two most significant bits of the input variable are identical.

8. The circuit as claimed in claim 1, wherein the input variable is represented by a first least-significant bit field, by a second median-significant bit field and by a third most-significant bit field, the third means calculate via interpolation an interpolated value of the trigonometric function for the value of the input variable, and the third means comprise:

a first memory bank for storing a limited number of negative values of the function which corresponds to the second bit field, at addresses coming from the second bit field, a second memory bank for storing interpolation coefficients associated to the values stored in the first memory bank, at addresses coming from the second bit field, and interpolation means for reading from the first memory bank an approximate value of the function by addressing the first memory bank by the second bit field of the input variable, for reading from the second memory bank the interpolation coefficient by addressing the second memory bank by the second bit field of the input variable, for calculating an interpolated value by multiplying the first bit field of the input variable by the addressed interpolation coefficient, while the interpolated value is summed with the approximate value to produce the interpolated value.

9. A digital data processing system, the system comprising a circuit for calculating at least one of a Fourier transform or discrete cosine transform or a transform that uses a trigonometric function, the circuit adapted to multiply data by values of a trigonometric function of an input variable, the circuit comprising:

first means for carrying out a multiplication by applying a Booth algorithm, second means for generating control signals applied to the first means, among which are sign control signals which are in conformity with the Booth algorithm, third means for producing the values of the trigonometric function, wherein the third means produce values of the trigonometric function in a limited field of the input variable, and in that the circuit comprises means for modifying the sign control signals in accordance with the input variable and converter means for converting the input variable to provide that the circuit works with any value of the input variable.

10. The circuit as claimed in claim 9, wherein the third means produce negative values of the trigonometric function.

11. The circuit as claimed in claim 10, wherein the sign control signals are inverted when the two most significant bits of the input variable are identical.

12. The circuit as claimed in claim 11, wherein the third means calculate the value of the trigonometric function via interpolation around a limited number of previously stored function values.

13. The circuit as claimed in claim 12, wherein the input variable is represented by a first least-significant bit field, by a second median-significant bit field and by a third most-significant bit field, and the third means comprise:

a first memory bank for storing a limited number of negative values of the function which corresponds to the second bit field, at addresses coming from the second bit field, a second memory bank for storing interpolation coefficients associated to the values stored in the first memory bank, at addresses coming from the second bit field, and interpolation means for reading from the first memory bank an approximate value of the function by addressing the first memory bank by the second bit field of the input variable, for reading from the second memory bank the interpolation coefficient by addressing the second memory bank by the second bit field of the input variable, for calculating an interpolated value by multiplying the first bit field of the input variable by the addressed interpolation coefficient, while the interpolated value is summed with the approximate value to produce the interpolated value.

14. The circuit as claimed in claim 9, wherein the input variable is represented by a first least-significant bit field, by a second median-significant bit field and by a third most-significant bit field, the third means calculate via interpolation an interpolated value of the trigonometric function for the value of the input variable, and the third means comprise:

a first memory bank for storing a limited number of negative values of the function which corresponds to the second bit field, at addresses coming from the second bit field, a second memory bank for storing interpolation coefficients associated to the values stored in the first memory bank, at addresses coming from the second bit field, and interpolation means for reading from the first memory bank an approximate value of the function by addressing the first memory bank by the second bit field of the input variable, for reading from the second memory bank the interpolation coefficient by addressing the second memory bank by the second bit field of the input variable, for calculating an interpolated value by multiplying the first bit field of the input variable by the addressed interpolation coefficient, while the interpolated value is summed with the approximate value to produce the interpolated value.

15. A digital transmission system, the system comprising a circuit for forming a digital carrier recovery circuit, the circuit adapted to multiply data by values of a trigonometric function of an input variable, the circuit comprising:

first means for carrying out a multiplication by applying a Booth algorithm, second means for generating control signals applied to the first means, among which are sign control signals which are in conformity with the Booth algorithm, third means for producing the values of the trigonometric function, wherein the third means produce values of the trigonometric function, in a limited field of the input variable, and in that the circuit comprises means for modifying the sign control signals in accordance with the input variable and converter means for converting the input variable to provide that the circuit works with any value of the input variable.

16. The circuit as claimed in claim 15, wherein the third means produce negative values of the trigonometric function.

17. The circuit as claimed in claim 16, wherein the sign control signals are inverted when the two most significant bits of the input variable are identical.

18. The circuit as claimed in claim 17, wherein the third means calculate the value of the trigonometric function via interpolation around a limited number of previously stored function values.

19. The circuit as claimed in claim 18, wherein the input variable is represented by a first least-significant bit field, by a second median-significant bit field and by a third most-significant bit field, and the third means comprise:

a first memory bank for storing a limited number of negative values of the function which corresponds to the second bit field, at addresses coming from the second bit field, a second memory bank for storing interpolation coefficients associated to the values stored in the first memory bank, at addresses coming from the second bit field, and interpolation means for reading from the first memory bank an approximate value of the function by addressing the first memory bank by the second bit field of the input variable, for reading from the second memory bank the interpolation coefficient by addressing the second memory bank by the second bit field of the input variable, for calculating an interpolated value by multiplying the first bit field of the input variable by the addressed interpolation coefficient, while the interpolated value is summed with the approximate value to produce the interpolated value.

20. The circuit as claimed in claim 7, wherein the input variable is represented by a first least-significant bit field, by a second median-significant bit field and by a third most-significant bit field, the third means calculate via interpolation an interpolated value of the trigonometric function for the value of the input variable, and the third means comprise:

a first memory bank for storing a limited number of negative values of the function which corresponds to the second bit field, at addresses coming from the second bit field, a second memory bank for storing interpolation coefficients associated to the values stored in the first memory bank, at addresses coming from the second bit field, and interpolation means for reading from the first memory bank an approximate value of the function by addressing the first memory bank by the second bit field of the input variable, for reading from the second memory bank the interpolation coefficient by addressing the second memory bank by the second bit field of the input variable, for calculating an interpolated value by multiplying the first bit field of the input variable by the addressed interpolation coefficient, while the interpolated value is summed with the approximate value to produce the interpolated value.

* * * * *